Oct. 23, 1923.  
A. F. CAVANAUGH  
AUTOMOBILE LOCK  
Filed March 6, 1922  
1,471,382
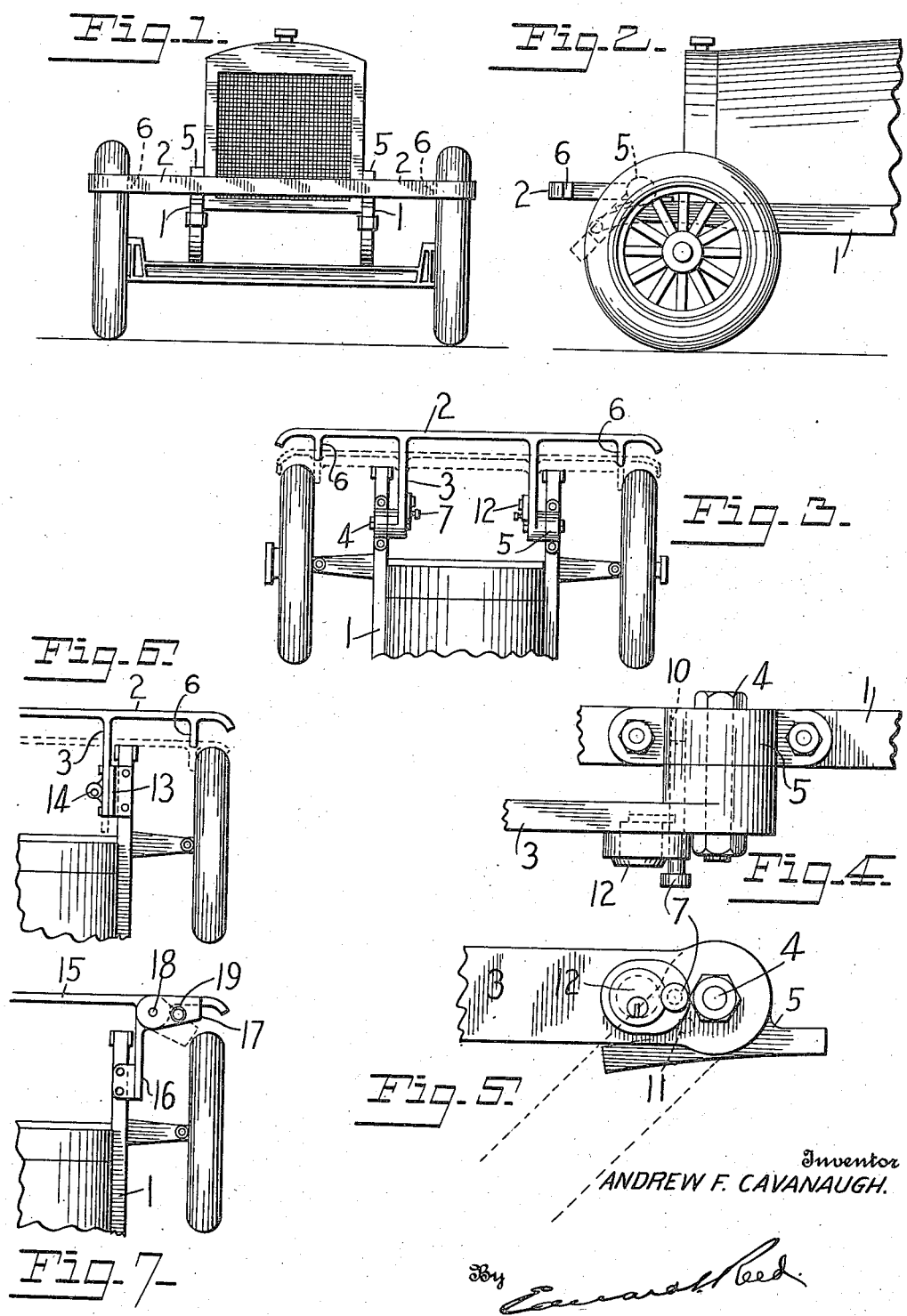
Inventor  
ANDREW F. CAVANAUGH.  
By  
Attorney Patented Oct. 23, 1923.

1,471,382

UNITED STATES PATENT OFFICE.

ANDREW F. CAVANAUGH, OF DAYTON, OHIO.

AUTOMOBILE LOCK.

Application filed March 6, 1922. Serial No. 541,359.

*To all whom it may concern:*

Be it known that I, ANDREW F. CAVANAUGH, a citizen of the United States, residing at Dayton, in the county of Montgomery and State of Ohio, have invented certain new and useful Improvements in Automobile Locks, of which the following is a specification, reference being had therein to the accompanying drawing.

This invention relates to an automobile lock.

One object of the invention is to protect an automobile against theft by locking the front wheels against steering movement.

A further object of the invention is to combine with the bumper a lock for the steering wheels.

A further object of the invention is to provide such a lock which will be of a strong, durable character and which will positively lock the wheels against steering movement.

Other objects of the invention may appear as the device is described in detail.

In the accompanying drawings Fig. 1 is a front elevation of an automobile showing the invention applied thereto; Fig. 2 is a side elevation of the same; Fig. 3 is a plan view of the chassis, showing the invention applied thereto; Fig. 4 is a detail plan view of the pivotal connection between the combined bumper and lock and the chassis; Fig. 5 is a side elevation of the same; Fig. 6 is a plan view of a portion of a chassis and bumper showing a modified form of the invention; and Fig. 7 is a view similar to Fig. 6 showing a further modification of the invention.

In carrying out my invention I mount upon the chassis of the automobile a locking device which is movable into and out of a position in which it will hold the front or steering wheels of the automobile against steering movement, thereby effectually preventing the driving of the machine but permitting the same to be moved in a straight line from one position to another. The device preferably comprises two parts, one for each wheel, which may be so mounted that they will move in unison or they may be separately movable into and out of their locking positions. The bumper, which is usually mounted on the chassis in front of the wheels forms a convenient support for the locking device, and I prefer to rigidly mount the two members of the locking device on the bumper and to so mount the bumper on the chassis that it may be moved into and out of a position which will place the locking members in locking relation to the respective wheels, means being provided, of course, to lock the bumper with the locking members in their locking positions.

As shown in Figs. 1 to 5, the chassis 1 of the automobile has mounted thereon a bumper consisting of a transverse bar 2 and rearwardly extending supporting arms 3 which are connected at their rear ends with a suitable part of the chassis. In this particular form of the device the arms 3 are pivotally mounted on studs, or bolts, 4 mounted in bearing brackets 5 so that the bumper will move about a horizontal axis. Mounted on the bumper are two locking members 6 which, in the present instance, are in the form of rearwardly extending lugs formed integral with the transverse member 2 of the bumper and of such length and so arranged that when the bumper is in its normal, or elevated, position, as shown in Fig. 2, the lugs, or locking members, will be spaced a sufficient distance from the wheels to avoid any interference with the steering movement thereof, but when the bumper is moved to its lowermost position, as shown in dotted lines in Figs. 2 and 3, the locking members, or lugs, 6 will be caused to overlap the respective steering wheels and to be located close to the inner sides of these wheels, thereby effectually preventing any steering movement of these wheels. The bumper may be secured in its adjusted positions in any suitable manner but I preferably employ a key controlled lock for this purpose and, as here shown, I have mounted in the arm 3 of the bumper a locking bolt 7 which is adapted to be inserted in either of two openings 10 and 11 formed in the bracket 5 on which the arm is mounted, the openings 10 and 11 being so arranged that when the locking bolt is in the upper opening 10 the bumper will be held in its normal elevated position and when the bolt is in the lower opening 11 the bumper will be firmly secured in its lower position with the locking members in operative relation to the steering wheels. The movement of the bolt is controlled by a key controlled lock 12 which may be of any suitable character and is here shown as of the Yale type. Obviously a key controlled lock may be applied to either or both of the arms 3, as may seem desirable.

In Fig. 6 of the drawings I have shown a combined bumper and locking device similar to that above described, with the exception that the bumper supporting arms 3 are slidably mounted on the chassis so that the bumper moves forwardly and rearwardly in a substantially horizontal plane. To this end the arms 3 are slidably mounted in fore and aft guideways formed in the supporting brackets 13 which are mounted on the chassis and its movement from one position to the other is controlled by a key controlled lock 14.

In Fig. 7 I have shown the bumper as rigidly mounted on the chassis. As there shown a transverse member 15 is provided with rearwardly extending arms 16 which are rigidly secured to the chassis. Mounted upon the bumper at one or each end thereof is a locking member 17 which is movable into and out of a position to lock the adjacent steering wheel against steering movement. As here shown, this locking member is in the form of an arm pivotally mounted at 18 on the bumper and so arranged that when in its normal position it will extend substantially parallel with the transverse member 15 of the bumper and will not interfere with the steering movement of the wheel. When moved rearwardly to the position shown in dotted lines in Fig. 7 this locking member will lie in the path of the wheel and will prevent it from being turned in one direction. Consequently, if a locking device be applied to the inner side of both wheels it will be impossible to turn either wheel in either direction. The locking member is held in its adjusted position by means of a key controlled lock 19, which may be of any suitable character.

It will be apparent from the foregoing description that I have provided a locking device which will positively hold the wheels of the automobile against steering movement and which can be very quickly and easily moved into and out of its locking position by a person holding a key but which can not be manipulated by an unauthorized person. Further, the lock being located at the front of the machine is in a conspicuous place so that any one attempting to tamper with the same would be quickly discovered.

It will be understood that while I have, in the several forms of the device here illustrated, shown the locking device as mounted on the bumper, this is not essential to the invention as the locking members for the wheels may be supported on the automobile in any suitable manner which will permit them to be moved into and out of their locking positions. Therefore, while I have shown and described certain embodiments of my invention I wish it to be understood that I do not desire to be limited to the details thereof as various modifications may occur to a person skilled in the art.

Having now fully described my invention what I claim as new and desire to secure by Letters Patent is:

1. The combination with a bumper having means for mounting the same on an automobile for bodily swinging movement toward and from the steering wheels thereof, of a device carried by said bumper and arranged to be moved therewith into a position to hold one of said steering wheels of said automobile against steering movement, and means to lock said bumper in said position.

2. The combination with a bumper having means for mounting the same on an automobile for fore and aft movement relative thereto, of a device carried by said bumper and arranged to move therewith into a position to hold one of said wheels of the automobile against steering movement, and means to lock said bumper in said position.

3. The combination with a bumper for an automobile or the like, comprising a transverse member and rearwardly extending arms supporting said transverse member, of means for slidably mounting said arms on an automobile, parts carried by the respective end portions of said transverse member and adapted to be moved into and out of locking relation with the respective wheels of said automobile by the movement of said bumper, and means for locking said bumper in its adjusted position.

4. The combination with a bumper for an automobile, or the like comprising a transverse member and rearwardly extending arms supporting said transverse member and adapted to be movably mounted on an automobile, of locking members mounted on said transverse member of said bumper and arranged to be carried into locking relation with the respective wheels of said automobile by the movement of said bumper, and means for locking said bumper in said position.

5. The combination with a bumper for an automobile, or the like, comprising a transverse member, arms supporting said transverse member, and means for pivotally mounting said arms on said automobile, of locking members rigidly secured to and extending rearwardly from said transverse bar, and so arranged that when said bumper is moved in one direction about the axis of said arms, said locking members will be moved into positions to hold the respective steering wheels of said automobile against steering movement, and means to lock said bumper in said position.

In testimony whereof, I affix my signature hereto.

ANDREW F. CAVANAUGH.